(No Model.)
A. GRAFF.
PNEUMATIC TIRE.
No. 562,893.
Patented June 30, 1896.
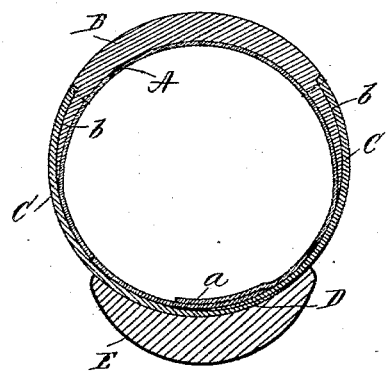
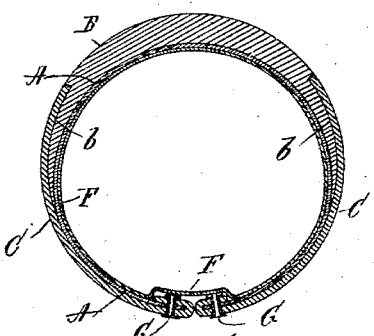
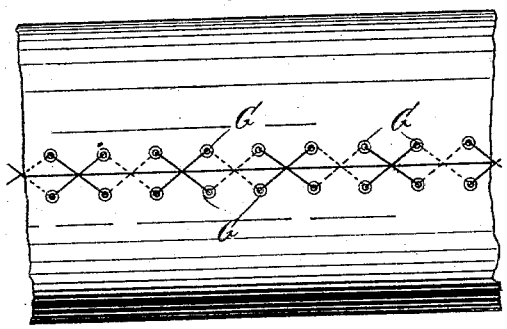
WITNESSES:
John Buckler
C Geris
INVENTOR
Andrew Graff,
BY
Edgar Tate & Co
ATTORNEYS

UNITED STATES PATENT OFFICE.

ANDREW GRAFF, OF BROOKLYN, NEW YORK.

PNEUMATIC TIRE.

SPECIFICATION forming part of Letters Patent No. 562,893, dated June 30, 1896.

Application filed October 22, 1895. Serial No. 566,527. (No model.)

*To all whom it may concern:*

Be it known that I, ANDREW GRAFF, a citizen of the United States, and a resident of Brooklyn, in the county of Kings and State of New York, have invented certain new and useful Improvements in Pneumatic Tires, of which the following is a specification, reference being had to the accompanying drawings, forming a part thereof, in which similar letters of reference indicate corresponding parts.

This invention relates to pneumatic tires for bicycles and similar vehicles, and the object thereof is to provide an effective tire of this class, which will be more durable than usual, and which will not be liable to be punctured or otherwise injured, so as to render the same useless; a further object being to provide a tire of this kind which is simple in construction and which is comparatively inexpensive.

The invention is fully disclosed in the following specification, of which the accompanying drawings form a part, in which—

Figure 1 is a transverse section of my improved tire; Fig. 2, a similar view showing a modified form of construction, and Fig. 3 an inner side view of a section thereof.

In the practice of my invention I provide a pneumatic tire consisting of an inner canvas tube A, which is formed from a strip of canvas cut the required length and width to form the tube and given one or more coats of cement, which is preferably waterproof, and after being allowed to dry, the sides thereof are overlapped, as shown at *a*, and cemented together or stitched and cemented together, and the tube A thus formed is inclosed by an outer tube of leather composed of a bearing portion B, of sole-leather, which has been previously treated in such manner as to render it flexible, said outer or bearing portion being wide enough in cross-section to extend a little more than half-way around the tube A, and the outer portions of the sides thereof being cut away or scarfed, as shown at *b*, and secured to each side are strips C, of thinner and softer leather, said strips C being cemented thereto or stitched and cemented thereto, and the free edges of the strips C are then overlapped and cemented or stitched and cemented together, as shown at D, and these overlapped portions of the strips C are also cemented or stitched and cemented to the inner tube A.

My improved tire may be secured to the rim E of a wheel in any desired or in the usual manner, and, as will be understood, the usual means for inflating the same with air are provided.

In the construction shown in Fig. 2 I also employ a tube A, which is composed of canvas coated with cement, as hereinbefore described, and within this tube is arranged or placed a tube F, of rubber, and the adjacent edges of the strips C, where they meet on the inner side of the tire, are lapped or folded over the corresponding edges of the tube A, which is divided at this point, and passing therethrough are eyelets G, by which the adjacent inner edges of the tube A and the outer tube, composed of the parts B and C, are stitched together, as shown in Fig. 3, and it will also be seen that the inner tube F is continuous, and that portion thereof adjacent to the eyelets G being also air-tight. This form of tire may also be connected with the rim of a wheel in the usual or any desired manner; and my invention is not limited to the means for making this connection, nor is it limited to the form, construction, and arrangement of parts herein described, and I therefore reserve the right to make all such alterations therein and modifications thereof as fairly come within the scope of the invention.

Having fully described my invention, I claim as new and desire to secure by Letters Patent—

1. A pneumatic tire for bicycles and other vehicles, comprising an inner tube of canvas which is coated with cement, said tube being formed from a strip of the material, and the sides thereof being overlapped and cemented together and an outer tube composed of a bearing portion of sole-leather, which extends part way around the inner tube, and the sides of which are cut away or scarfed and provided with strips of thinner leather which are secured thereto, said strips being overlapped to form a tube and cemented together, and to the inner tube, substantially as shown and described.

2. A pneumatic tire for bicycles or other vehicles, composed of an inner tube of canvas formed from a strip of the material, which is coated with cement and the sides of which are overlapped or cemented together to form a tube, and an outer tube composed of a bearing portion of sole-leather which extends part way around the inner tube and the sides of which are scarfed or beveled, and strips of thinner leather stitched and cemented thereto, said strips being also overlapped to form a tube, and stitched and cemented together, and said parts being also secured to the inner tube, substantially as shown and described.

3. A pneumatic tire for bicycles or other vehicles, comprising an inner tube of canvas which is coated with cement, and an outer tube which is composed of a bearing portion of sole-leather, the sides of which extend part way around the inner tube and are scarfed or thinned and strips of thinner leather which are secured thereto, the adjacent edges of said strips being secured together, substantially as shown and described.

4. A pneumatic tire for bicycles or other vehicles, comprising an inner tube of canvas which is coated with cement, and an outer tube which is composed of a bearing portion of sole-leather, the sides of which extend part way around the inner tube and are scarfed or thinned and strips of thinner leather which are secured thereto, the adjacent edges of said strips being secured together, and an inner tube of rubber within the canvas tube, substantially as shown and described.

5. A pneumatic tire for bicycles or other vehicles, comprising an inner tube of canvas which is coated with cement, and an outer tube which is composed of a bearing portion of sole-leather, the sides of which extend part way around the inner tube and are scarfed or thinned, and strips of thinner leather which are secured thereto, the adjacent edges of said strips being secured together, and an inner tube of rubber within the canvas tube, the adjacent edges of the outer strips of leather being folded over the adjacent edges of the tube of canvas which is divided on the inner side, and said folded portions being provided with eyelets by which the separate parts of the outer tube are laced together, substantially as shown and described.

In testimony that I claim the foregoing as my invention I have signed my name, in presence of the subscribing witnesses, this 21st day of October, 1895.

ANDREW GRAFF.

Witnesses:
C. GERST,
M. OPPENHEIMER.